Jan. 18, 1949.        G. W. FYLER        2,459,638
HIGH VOLTAGE POWER SUPPLY
Filed April 7, 1948

INVENTOR.
George W. Fyler
BY Foorman L. Mueller
Atty.

Patented Jan. 18, 1949

2,459,638

UNITED STATES PATENT OFFICE 2,459,638

HIGH-VOLTAGE POWER SUPPLY

George W. Fyler, Lombard, Ill., assignor to Motorola, Inc., Chicago, Ill., a corporation of Illinois Application April 7, 1948, Serial No. 19,482

2 Claims. (Cl. 250—36)

This invention relates to high-voltage power supplies for use in television systems and the like.

Cathode ray tubes employed in television sets require extremely high direct-current voltages for their operation. A common type of high-voltage power supply for such tubes utilizes a radio-frequency oscillator, a transformer and a rectifier. The radio-frequency output of the oscillator is stepped up by the transformer and applied to the rectifier, which converts this output to direct current. In order to sustain oscillations, there must be a feed-back from the secondary side of the transformer to the control element or grid of the oscillator. Customarily this feed-back has been provided by means of a tickler winding or turn on the transformer. Considerable difficulty has been experienced with these tickler arrangements due to the severe insulation requirements and the construction problems involved.

An object of the present invention is to provide an improved feed-back device for high-voltage power supplies which replaces the conventional tickler.

Another object is to utilize a novel form of capacitive coupling for the feed-back.

Still another object is to mount the feed-back element directly on the rectifier tube.

A feature of the invention is the provision of a feed-back element in the form of a coil spring disposed around the envelope of the rectifier. There is sufficient capacitive coupling between this coil spring and the rectifier anode at radio frequency to effect the necessary feed-back to the oscillator. This arrangement does not require a specially built rectifier tube, as it can readily be applied to conventional tubes.

Figure 1:
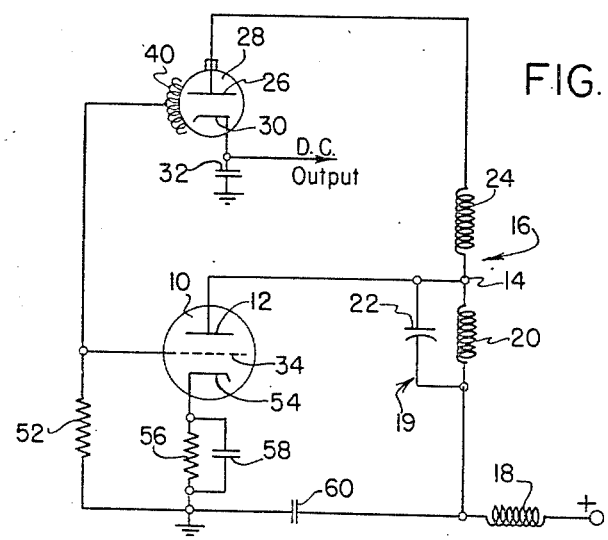
Figure 2:
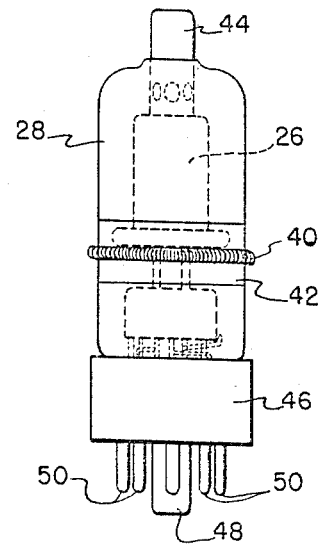

The foregoing and other objects, features and advantages of the invention will be better understood by reference to the following description taken in connection with the accompanying drawing, wherein:

Fig. 1 is a schematic diagram of a high-voltage power supply constructed in accordance with and embodying the principles of the invention; and Fig. 2 is an elevational view of a rectifier tube equipped with a feed-back element as described above.

In practicing the invention, the output of a radio-frequency oscillator is fed through an auto-transformer to a diode. A coil spring is positioned on the envelope of the diode so as to have the desired capacitive coupling with the anode of the tube, and this spring is connected to the control grid of the oscillator tube to provide correct grid excitation voltage. Capacitive feed-back takes place between the rectifier anode and the coil spring to sustain oscillations in the oscillator circuit.

Referring now to Fig. 1, the radio-frequency oscillator includes a triode 10 having an anode 12 which is connected to the intermediate tap 14 of an auto-transformer 16. The anode supply voltage for the tube 10 is furnished through a radio-frequency choke 18 and the coil 20 of the transformer 16 to the anode 12. The tank circuit 19 of the oscillator is formed by the coil 20 in parallel with a capacitor 22 which resonates with the coil 20 at a predetermined radio-frequency. This tank circuit is roughly tuned to the natural frequency of the transformer secondary, which comprises the coils 20 and 24 in series. This arrangement generates a high voltage of, say, 6,000 peak volts in the transformer secondary.

The high radio-frequency voltage is applied to the anode 26 of a diode rectifier 28. The cathode 30 of the rectifier 28 is connected through a filter capacitor 32 to ground. The radio-frequency oscillations are rectified by the diode 28 and filtered by the capacitor 32 (together with any other filter elements that may be employed in the circuit) to furnish the direct-current output voltage of the power supply.

For sustaining oscillations, the control grid 34 of the oscillator tube 10 must be supplied with radio-frequency voltage of approximately the correct amplitude in proper phase relation to the oscillations in the tank circuit 19 to maintain these oscillations. The feed-back required for this purpose can be obtained by means of a capacitive coupling with the anode 26 of the rectifier 28. In accordance with the invention, a coil spring 40 (fragmentarily represented in Fig. 1 and shown more fully in Fig. 2) is carefully mounted on the envelope of the tube 28. A strip of tape 42 is placed around the tube envelope in the approximate correct location, and the spring 40 is placed over this tape and cemented in place. The tape 42 serves to locate the spring 40 properly, keeps the spring in its proper position, and increases the insulation. The cement prevents corona.

The tube 28 represented in Fig. 2 is a typical diode structure (type 1B3GT, for example) which may be utilized, but the invention is not, of course, limited to this particular form of tube. The tube electrodes are concentric, the anode 26 constituting the outer electrode. Before being cemented in place, the spring 40 may be adjusted up or down for positioning relative to the electrostatic field of the tube so as to provide optimum grid excitation voltage. The adjustable capacity between the anode 26 and spring 40, in series with the fixed input impedance of the tube 10, constitutes a voltage divider for this purpose. A range of 2/1 is easily obtained.

The anode 26 is electrically connected to a cap 44 on the top of the tube 28, to which the lead from the transformer 16 is connected by a suitable clip (not shown). The tube base 46 is provided with the usual centering post 48 and prongs 50. The tube envelope 28 may be of glass or other suitable material which does not form an electrostatic shield about the anode 26. The glass envelope serves as an insulator and provides good surface creepage insulation even under high humidity conditions.

The control grid 34 of the oscillator tube 10 is connected to ground through a grid leak resistor 52 having a high resistance. The cathode 54 of tube 10 is connected through the parallel combination of a bias resistor 56 and bypass capacitor 58 to ground. A bypass capacitor 60 connects the low-voltage end of the tank circuit 18 to ground. The values of the various circuit components are chosen to provide the desired radio-frequency, which may be on the order of 140 kilocycles.

The above described arrangement dispenses with the troublesome tickler or feed-back inductance which has been employed in power supplies of this kind prior to the present invention. The coil spring 40 is very convenient to use by comparison with the conventional ticklers, and the high voltage performance is more uniform and reliable in manufactured sets using this device.

While a preferred embodiment of the invention has been disclosed, this obviously can be modified without departing from the principles stated above, and it is intended that the appended claims shall cover all such modifications.

I claim:

1. In a high voltage, direct current power supply system, the combination including an oscillator circuit providing an oscillatory voltage, an inductance having two portions with one portion electrically connected into said oscillator circuit, a rectifier tube having a cylindrical insulating envelope and concentric rectifying elements within said envelope, said rectifying elements including an inner cathode and an outer tubular anode, said inductance portions being so connected and phased that said oscillatory voltage is stepped up therein, said inductance being connected to said anode for supplying said stepped up voltage thereto, and means for providing energy feed-back to said oscillator circuit comprising an electrically conductive tension coiled spring adjustably mounted on the outside of said envelope of said tube and capacitively coupled to said tubular anode, said spring being electrically connected to said oscillator circuit and providing feedback therefor.

2. In a direct current power supply system for providing the voltage required for the anode of a cathode ray tube, the combination including an oscillator circuit providing an oscillatory voltage, an auto-transformer having two portions with one portion electrically connected into said oscillator circuit, a rectifier tube having a cylindrical glass envelope and concentric rectifying elements within said envelope, said rectifying elements including an inner cathode and an outer tubular anode spaced from said glass envelope, said auto-transformer portions being so connected and phased that said oscillatory voltage is stepped up therein, said anode being connected to said auto-transformer at the high voltage point thereon for providing a unidirectional voltage output and means for providing energy feed-back to said oscillator circuit comprising an electrically conductive tension coiled spring adjustably mounted on the outside of said glass envelope and capacitively coupled to said tubular anode, said spring being electrically connected to said oscillator circuit and providing feedback therefor.

GEORGE W. FYLER.

REFERENCES CITED

The following references are of record in the file of this patent:

UNITED STATES PATENTS

| Number | Name | Date |
| --- | --- | --- |
| 628,026 | O'Neill | July 4, 1899 |
| 1,937,389 | Langer | Nov. 28, 1933 |
| 2,012,710 | Crosby | Aug. 27, 1935 |
| 2,157,534 | George et al. | May 9, 1939 |
| 2,252,189 | Langer | Aug. 12, 1941 |
| 2,306,888 | Knick | Dec. 29, 1942 |
| 2,332,182 | Stearns | Oct. 19, 1943 |
| 2,374,781 | Schade | May 1, 1945 |
| 2,413,932 | Sziklai | Jan. 7, 1947 |